Dec. 10, 1929.  A. JENSEN  1,738,954
LIQUID TREATING APPARATUS
Filed June 6, 1927  3 Sheets-Sheet 1
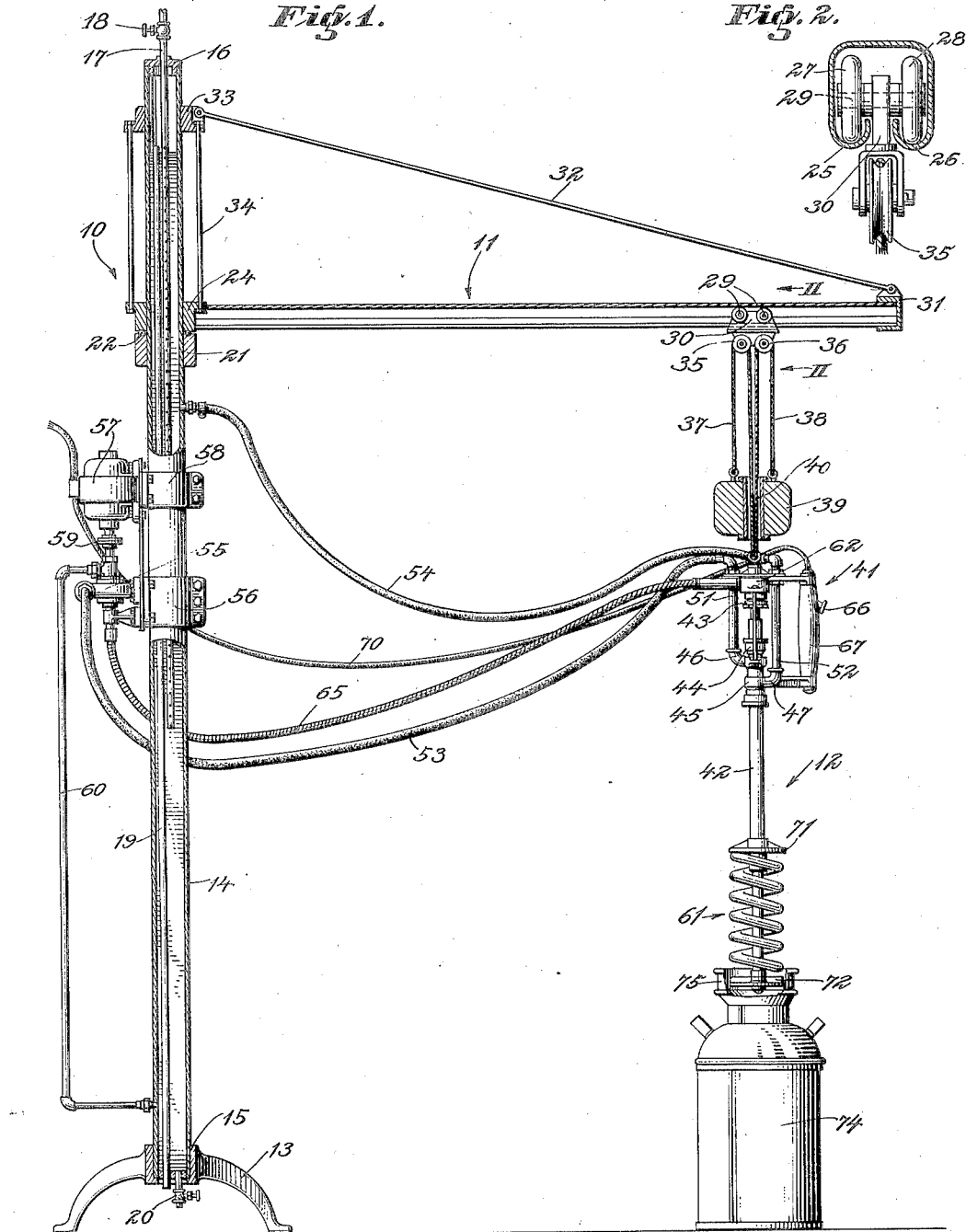
INVENTOR.
Aage Jensen
BY
Townsend, Loftus & Abbett
ATTORNEYS.

Dec. 10, 1929.  A. JENSEN  1,738,954
LIQUID TREATING APPARATUS
Filed June 6, 1927   3 Sheets-Sheet 2
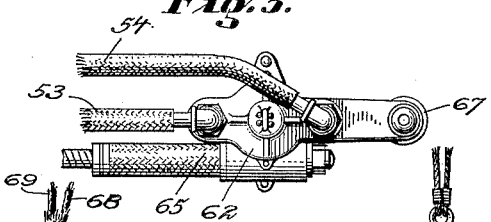
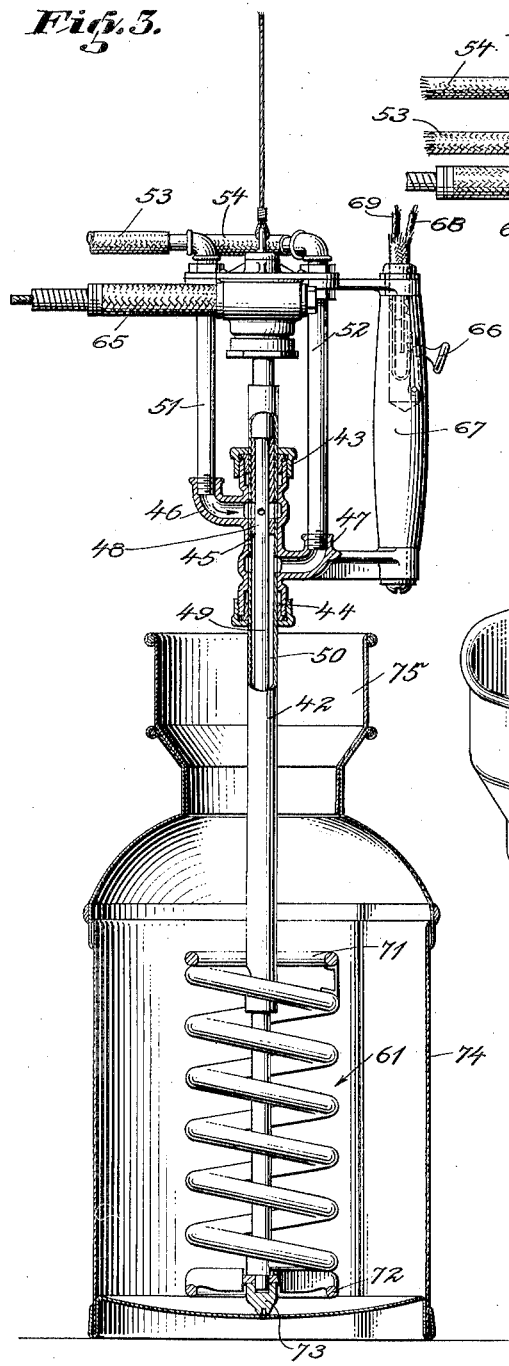
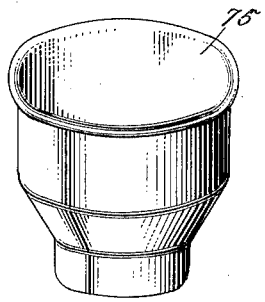
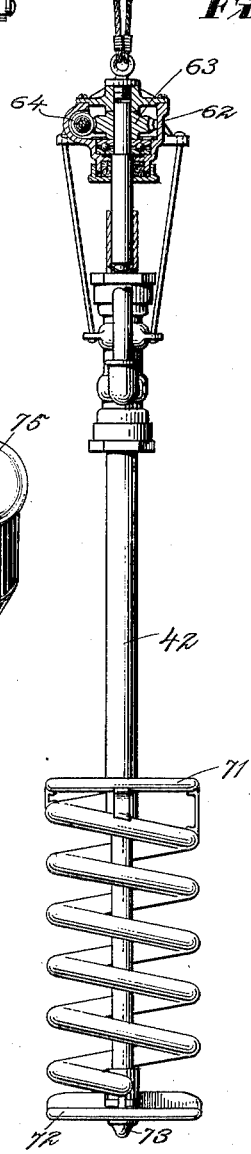
INVENTOR.
Aage Jensen
BY
Townsend, Loftus & Abbett
ATTORNEYS.

Dec. 10, 1929.  A. JENSEN  1,738,954
LIQUID TREATING APPARATUS
Filed June 6, 1927  3 Sheets-Sheet 3

INVENTOR.
Aage Jensen
BY
Townsend, Loftus & affett
ATTORNEYS.

Patented Dec. 10, 1929

1,738,954

UNITED STATES PATENT OFFICE

AAGE JENSEN, OF LOS ANGELES, CALIFORNIA

LIQUID-TREATING APPARATUS

Application filed June 6, 1927. Serial No. 196,775.

This invention relates to apparatus for treating liquid and particularly pertains to means for simultaneously agitating and rapidly changing the temperature of the liquid.

It has been found desirable to change the temperature of various liquids in a minimum length of time and in a manner which will prevent deterioration of the liquid; as, for example, in the treatment of heavy density liquids to raise their temperature extremely careful handling must be observed in order to prevent accumulation of the dense material upon the heating surfaces to cause this material to become scorched and a similar taste to be imparted to the liquid. It is the principal object of the present invention, therefore, to provide means whereby liquid may be rapidly heated without deterioration due to heat, or rapidly cooled in a minimum period of time.

The present invention contemplates the use of an immersion heating or cooling element which may be submerged in a body of liquid to be treated and which is thereafter agitated to cause its radiation surface to come into contact with a maximum amount of the fluid recurrently within a minimum period of time whereby greater heat transfer will take place than is accomplished when the liquid is substantially motionless with relation to the heating or cooling medium, making the device particularly applicable for use in emulsifying, pasteurizing, cooling and otherwise treating liquids to change their temperatures.

The invention is illustrated by way of example in the accompanying drawings in which—

Figure 1 is a view in side elevation with parts broken away to disclose the structural details and relation of parts of one part of the present invention.

Figure 2 is an enlarged view in section through a section of the trolley and track as seen on the line 2—2 of Figure 1.

Figure 3 is an enlarged view showing a coil unit submerged in a container, the upper part of the unit being broken away to disclose the circulating head.

Figure 4 is a view in side elevation and vertical section showing the device disclosed in Figure 3 and more particularly disclosing the mechanism for rotating the heating element.

Figure 5 is a fragmentary view in plan showing the flexible connections with the head of the device disclosed in Figures 3 and 4.

Figure 6 is a perspective view of the expansion chamber to be applied to the container within which the liquid is placed.

Figure 7:
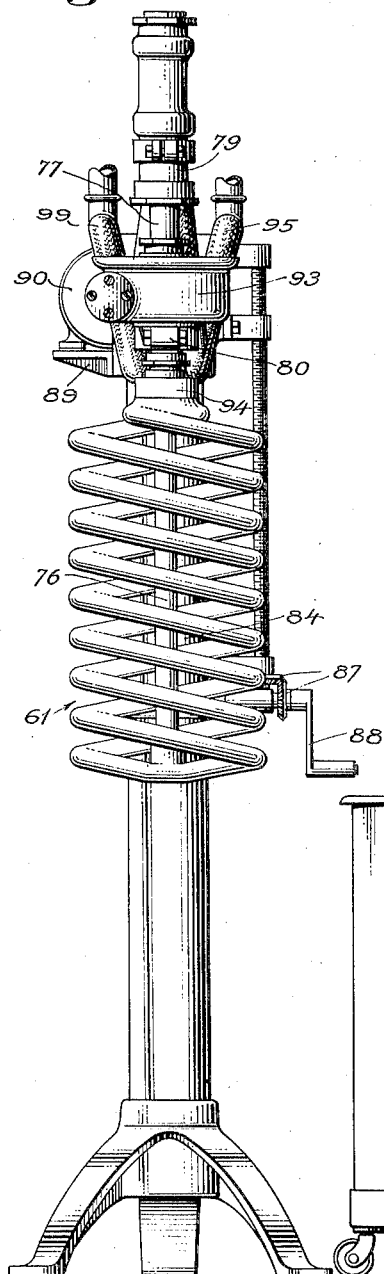
Figure 7 is a view in end elevation showing the agitating and heating member elevated with relation to a container.

Referring more particularly to Figure 1 of the drawings; it will be seen that a pedestal, 10, is provided having a horizontally swinging arm, 11, from which is supported a portable heating unit, 12. It is to be understood that while the description of the device as here disclosed particularly refers to the submerged moving coils as heating elements, that the invention is similarly adapted for use with cooling mediums and for the purpose of lowering the temperature of the liquids in which the coils are submerged. The pedestal 10 comprises a base portion, 13, carrying a tubular column, 14, which extends vertically. This column is closed by an end wall, 15, at its lower end and a cover member, 16, at its upper end. Extending downwardly through the cover member 16 and for a considerable distance within the column is a pipe, 17, which may be in communication with a supply of steam when the device is to be used for heating purposes. The flow of steam through the pipe 17 is controlled by a valve, 18. The wall of the steam pipe 17 within the column is perforated so that the steam may pass into the column and may thereafter flow through the circulating tubes as will be hereinafter described. An overflow drain pipe, 19, extends longitudinally within the column and for a distance substantially equal to the height of the column. The lower end of this pipe extends through the end wall 15. Condensate accumulating within the column may overflow into the upper end of the overflow pipe, 19, when it has accumulated to a desired volume. A drain valve, 20, is connected with the lower end of the column and permits all of the condensate to be drained from the column if desired. Mounted upon the column and fixed with relation thereto is a supporting collar, 21, having a radial ball rail, 22, on its upper face and against which a bearing collar, 24, may rest. The bearing collar is free to rotate around the column and serves as a support for the track structure 11. This structure, as particularly shown in Figure 2, of the drawing, comprises a pair of parallel tracks, 25 and 26, along which wheels 27 and 28 may run and on the axle 29 between said wheels a block, 30, may be supported. The outer end of the track structure is provided with a cap, 31, to which a guy wire, 32, is secured. This wire is fastened at its other end to a collar, 33, which is free to rotate around the column 14 and is held in spaced relation to the collar, 24, by a series of bolts, 34. By this arrangement it will be seen that the track structure may swing around the axis of the column in horizontal plane and will at the same time permit the block 30 to move toward and away from the column as convenience dictates.

The block 30 carries a pair of pulley wheels, 35 and 36, around which ropes, 37 and 38, respectively, are rove. One end of each of said ropes is secured to a counter weight, 39. The opposite ends of the ropes pass downwardly through opening 40 in the center of the counter weight and are secured to the circulating head, 41, of the heating unit 12. This head is shown more in detail in Figure 3 of the drawings, where it will be seen that it comprises a central tubular shaft, 42, which extends vertically through stuffing boxes 43 and 44. The stuffing boxes form a part of a distributor casting, 45, formed with an inlet fitting 46 and an outlet fitting 47, both of which fittings are disposed between the stuffing box ends of the casting and are separated by a partition wall, 48. This wall is in the shape of a collar which fits between a central supply tube, 49, and the tube, 42, through which it extends. The inside diameter of the tubular shaft 42 and the outside diameter of the supply tube 49 are of such relation to each other that a return passageway, 50, will be formed between the walls of the two tubes and will permit liquid to flow out from the tubular shaft, 42, and into the fitting 47. An induction pipe, 51, is connected with the inflow fitting, 46, and an eduction pipe, 52, is connected with the outflow fitting 47. These pipes are provided with flexible connections, 53 and 54. The flexible connection 53 leads to a circulating pump, 55, which is secured to a bearing, 56, carried upon the column 14. This pump is directly driven by a motor, 57, secured to a bearing, 58, upon this column and connected with the shaft of the pump through a suitable driving coupling, 59. The circulating pump 55 receives its supply of heated liquid from a tube, 60, which connects the pump with the lower end of the column 14. The conduit 54 connecting with the eduction pipe 52 of the head is secured to the column at a point above the level of the pump so that a circulation of fluid may be had through the column and the pipes, as well as through the helical heating coil, 61, which is secured to the lower end of the tubular drive shaft, 42. The lower end of this coil connects with the inner supply tube 49 and the upper end of the coil connects with the passageway 50 between the inner supply tube 49 and the tube 42. The tubular driving shaft, 42, after extending through the casting 45 and the stuffing boxes 43 and 44 at the opposite ends thereof, then extends upwardly into a gear housing, 62, where it is suitably journalled within bearings and receives a worm gear wheel 63. This wheel is in mesh with a worm gear pinion 64 and by which the tubular shaft is driven. The pinion 64 is provided with a flexible drive shaft, 65, connected to the end of a shaft with a circulating pump, 55, and driven by the motor 57. The motor operates at a speed of substantially 1740 R. P. M. and the worm gears 63 and 64 have such a ratio to each other as to insure that the member 61 will rotate at a speed of substantially 225 revolutions per minute. The heating element 61 is formed of tubular material and is bent into the shape of a helix. The surface dimensions of the member are such as to insure that when the heating element is being rotated at a speed of 225 revolutions a minute, 4,000 lineal inches of radiation surface will be moved through the liquid.

The motor is controlled by a switch button 66 carried on the handle grip, 67, of the head, 41. This button closes a helical circuit through conductors 68 and 69 carried in a conduit, 70, and leading to the motor 57, as well as to a source of electrical supply.

In the form of the invention particularly disclosed in Figures 1, 3 and 4 of the drawings, the heating element 61 is formed with upper and lower guard rings, 71 and 72. The lower end of the tubular driving shaft of the heating unit is fitted with a bearing point 73 which may rest upon the bottom of a container 74 into which the heating element has been inserted. Due to the violent agitation of the liquid by the rotating member 61 an expansion member, 75, is positioned in the mouth of the container and prevents an overflow of the liquid when in motion.

Figure 8:
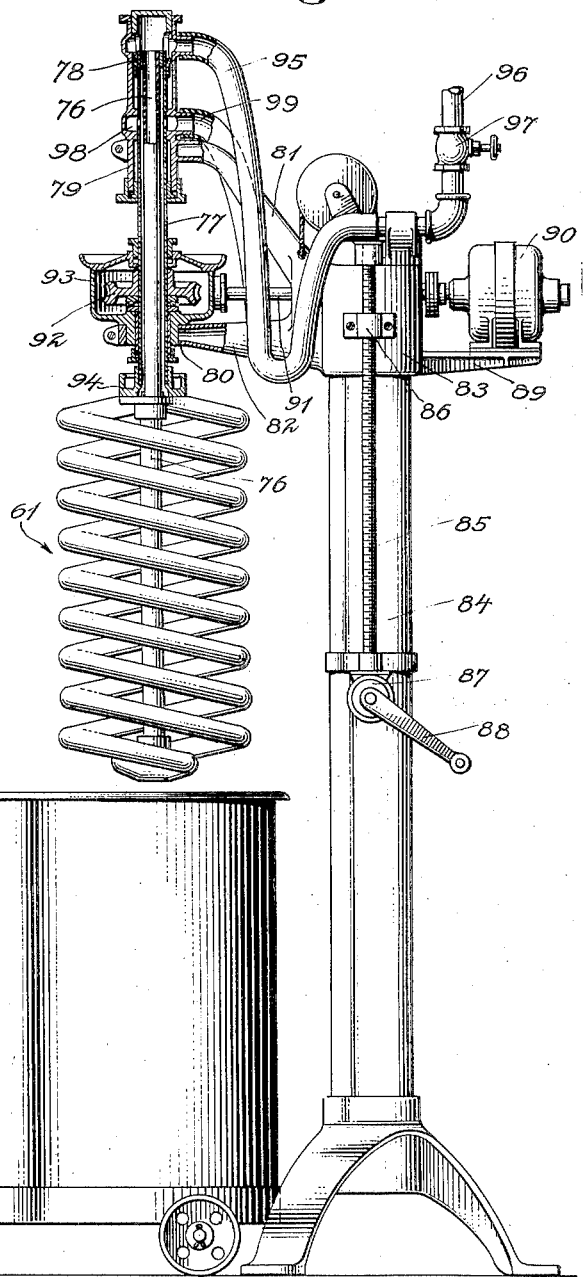
Figure 8 is a view in side elevation with parts broken away showing the form of the portable apparatus of Figure 7 and more clearly disclosing the fluid circulating system and the drive therefor.

In the form of the invention shown in Figures 7 and 8 the construction and operation is substantially the same as shown in Figure 1, with the exception that the heating element 61 may be raised and lowered by mechanical means instead of the counter weight 39. The heating element in this case is mounted upon a tubular shaft, 76, which extends upwardly through a tubular drive casing, 77, and is secured to the drive casing at its upper end by an intervening collar, 78, which closes the space around the tubular shaft 76 and between it and the tubular drive member 77. The tubular shaft and the tubular drive casing are suitably journaled in an upper bearing, 79, and a lower bearing, 80. The upper bearing is fitted with suitable stuffing boxes to prevent a leakage of fluid from around the shafts. The two bearings are carried by arms 81 and 82 forming a part of a sliding head structure, 83. This structure is mounted upon a vertical standard, 84, and may be raised or lowered by the operation of a screw, 85, which passes through a nut, 86, carried by the head and which at its lower end is fitted with gears, 87, and an operating crank, 88, by which it may be rotated. The moving head, 83, is fitted with a motor supporting platform, 89, upon which a motor, 90, is carried. This motor has a drive shaft, 91, directly connected to a worm pinion in mesh with the worm wheel, 92. The worm wheel is secured to the tubular drive shaft, 77, and rotates the same. A suitable housing, 93, encloses the worm wheel and also affords bearings for the tubular drive casing. Secured at the lower end of the tubular drive casing is a drip cup, 94, which will prevent extraneous material from flowing down the shafts and into the liquid to be treated. A circulation of fluid is effected through the heating element 61. The heating element in this case is shown as being in the form of a double helix, one end of which connects with the central tube, 76, and the other end of which connects with the surrounding passageway between the tube and the driving casing 77. A flexible conduit, 95, connects with the upper end of the bearing structure 79 and supplies a fluid which will pass centrally down through the tube 76 to one end of the tubular helix. A supply of fluid may be controlled in its flow to this column from a pipe, 96, by a valve, 97. A return flow of fluid from the other end of the heating element 61 is effected along the passageway occurring between the shaft 76 and the casing 77, and thence through a plurality of openings, 98, to a return flexible conduit, 99, which may be led to any convenient point of discharge.

In the operation of the form of the invention shown in Figures 1 to 5, inclusive, a container is fitted with the expansion collar, 75, and thereafter may be moved into the operating radius of the device. It will be understood that under normal conditions the heating element 61 is elevated above the normal top of the containers, and that a downward pull on the hand grip 67 will act against the counter weight 39 to cause the heating element 61 to be inserted into the container and submerged in the liquid. It will, of course, be understood that the heating element may be properly positioned with relation to the container due to the fact that the supporting arm 11 may have radial movement around the standard 14 and that in addition the trolley structure permits the distributing head and the stirring element to be moved radially with relation to the standard.

After the element 61 has been submerged in the liquid the switch button 66 may be pressed to complete the motor circuit. This will simultaneously cause the heating element 61 to be rotated and a circulation of fluid to be effected through the heating element. The heating element will be rotated due to the fact that the motor 57 will drive the flexible shaft 65 which in turn rotates the worm gears 64 and 63 and imparts rotary motion to the tubular shaft 42. At the same time the circulating pump 55 will be set in motion and will cause the hot fluid from the standard 14 to pass upwardly from tube 60 through the pump, thence along flexible conduit 53 to the head, where the fluid will then flow down through pipe 51 to the induction fitting 46, and thence to the central tube 49, after which it passes to the bottom of the heating element 61 and then circulates up through the convolutions of the heating element to the passageway 50 which occurs between the outer casing 42 and the central tube 49, and thereafter passing along pipe 52 to the flexible conduit 54 from which it is delivered into the upright 14.

It will of course be understood that various liquids and fluids may be circulated through the coil of the heating element 61, as for example, live steam, to obtain an extremely high temperature heat or a cooling medium when it is desired to cool the liquid.

In the form of the invention shown in Figures 7 and 8 of the drawings, the operation will be substantially identical with that previously described, with the exception that the circulating fluid is delivered from a pipe 96 to a flexible conduit 95 and thereafter caused to circulate through the central tube 76 to the heating element 61, and then to be exhausted from the heating element through the casing 77 to a flexible conduit 99. By manipulation of the crank 88 the heating element may be readily raised or lowered as convenience dictates.

It will thus be seen that the present invention provides a portable apparatus which may be conveniently adjusted with relation to liquid containers and which may be operated in conjunction with the liquid to insure that a maximum area of heat transfer surface will be passed through the liquid and in a manner to cause a maximum change of temperature in the liquid in a minimum period of time.

While I have shown the preferred form of my invention as now known to me, it will be understood that various changes might be made in the combination, construction and arrangement of parts by those skilled in the art without departing from the spirit of the invention as claimed.

Having thus described my invention, what I claim and desire to secure by Letters Patent is:

1. An apparatus for treating liquids, which comprises a stand, a tubular rotary element, means supporting said element from the stand, whereby it may be moved vertically, means carried by the stand for imparting rotary motion to said element, irrespective of its vertical position, and means for creating circulation of a fluid through said rotary element irrespective of its vertical position or its rotary movement, whereby an exchange of heat will be effected between the fluid and the liquid in which the rotary element may be submerged.

2. An apparatus for treating liquids, comprising a stand, a horizontally disposed arm carried thereby, a rotating member supported therefrom, said rotating member being helical and being formed of a tube, whereby a fluid may circulate throughout the length of the helix, a tubular supporting and driving member by which the rotary member is suspended from the rotary arm, means for raising and lowering said member with relation to its support, driving means for the member, and means for creating circulation of a heat transfer fluid through said rotating member.

3. An apparatus for treating liquids comprising a support, a rotary coil carried by the support in a manner to permit the same to be raised and lowered with respect to the support, whereby the coil may be moved into and out of a container, said coil being arranged to permit circulation of a treating medium therethrough, means arranged on the support for supplying the treating medium, and connections between the supply means and the coil, operative to permit raising and lowering of the latter without disconnecting the connections.

4. An apparatus for treating liquids comprising a support, a rotary coil suspended from the said support in a manner to be raised and lowered, whereby it may be moved into and out of a container, said coil being arranged to permit a treating fluid to be circulated therethrough, means on the support for supplying the treating fluid to the said coil, means on the support for imparting rotatable movement to the coil, and connections between the coil and the said supply means and between the coil and driving means, operative to permit the coil to be raised and lowered without disconnecting said connections.

AAGE JENSEN.